(12) United States Patent
Bono et al.

(10) Patent No.: US 10,272,799 B2
(45) Date of Patent: Apr. 30, 2019

(54) FUEL CELL SYSTEM

(71) Applicant: TOYOTA JIDOSHA KABUSHIKI KAISHA, Toyota-shi, Aichi-ken (JP)

(72) Inventors: Tetsuya Bono, Miyoshi (JP); Takashi Yamada, Hekinan (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/931,133

(22) Filed: Nov. 3, 2015

(65) Prior Publication Data

US 2016/0129808 A1 May 12, 2016

(30) Foreign Application Priority Data

Nov. 12, 2014 (JP) ................................. 2014-229833

(51) Int. Cl.
| | |
|---|---|
| *H01M 8/04007* | (2016.01) |
| *H01M 8/04029* | (2016.01) |
| *B60L 11/18* | (2006.01) |
| *H01M 8/04044* | (2016.01) |
| *H01M 8/0432* | (2016.01) |
| *H01M 8/04746* | (2016.01) |

(52) U.S. Cl.
CPC ..... *B60L 11/1892* (2013.01); *H01M 8/04029* (2013.01); *H01M 8/04044* (2013.01); *H01M 8/04358* (2013.01); *H01M 8/04768* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2004/0247959 A1 | 12/2004 | Kimbara et al. | |
| 2006/0147772 A1* | 7/2006 | Takemoto | H01M 8/04007 429/429 |
| 2007/0134526 A1 | 6/2007 | Numao et al. | |
| 2008/0311453 A1* | 12/2008 | Kobayashi | H01M 8/04029 429/404 |
| 2012/0003557 A1 | 1/2012 | Tanaka et al. | |

(Continued)

FOREIGN PATENT DOCUMENTS

| | | |
|---|---|---|
| DE | 112013002017 T | 3/2015 |
| JP | 2004-192854 A | 7/2004 |

(Continued)

*Primary Examiner* — Sarah A. Slifka
*Assistant Examiner* — Haroon S. Sheikh
(74) *Attorney, Agent, or Firm* — Finnegan, Henderson, Farabow, Garrett & Dunner, LLP

(57) ABSTRACT

A flow control valve 26 can adjust the percentage of the flow rate of cooling water to a radiator 23 to a predetermined value (50%) or smaller. When the temperature of the cooling water in a fuel cell 11 is determined to be a predetermined temperature (0° C.) or higher after the cooling water is supplied to the fuel cell 11 with the percentage of the flow rate of the cooling water to the radiator 23 set to the predetermined value (50%) or larger, a controller 41 performs a predetermined percentage supply operation for controlling the flow control valve 26 and a pump 22 to supply the cooling water to the fuel cell 11 with the percentage of the flow rate of the cooling water to the radiator 23 set to the predetermined value (50%) or larger.

5 Claims, 3 Drawing Sheets

(56) References Cited

U.S. PATENT DOCUMENTS

2013/0323540 A1 12/2013 Matsusue
2015/0072259 A1* 3/2015 Furukoshi ......... H01M 8/04029
   429/436

FOREIGN PATENT DOCUMENTS

| JP | 2005-190881 A | 7/2005 | |
|---|---|---|---|
| JP | 2007-134241 A | 5/2007 | |
| JP | 2009-059660 A | 3/2009 | |
| JP | 2010-186599 | 8/2010 | |
| JP | 2014-143070 A | 8/2014 | |
| WO | WO2013-153782 A1 | 10/2013 | |
| WO | WO2013153782 A1 * | 10/2013 | ........ H01M 8/04029 |

* cited by examiner

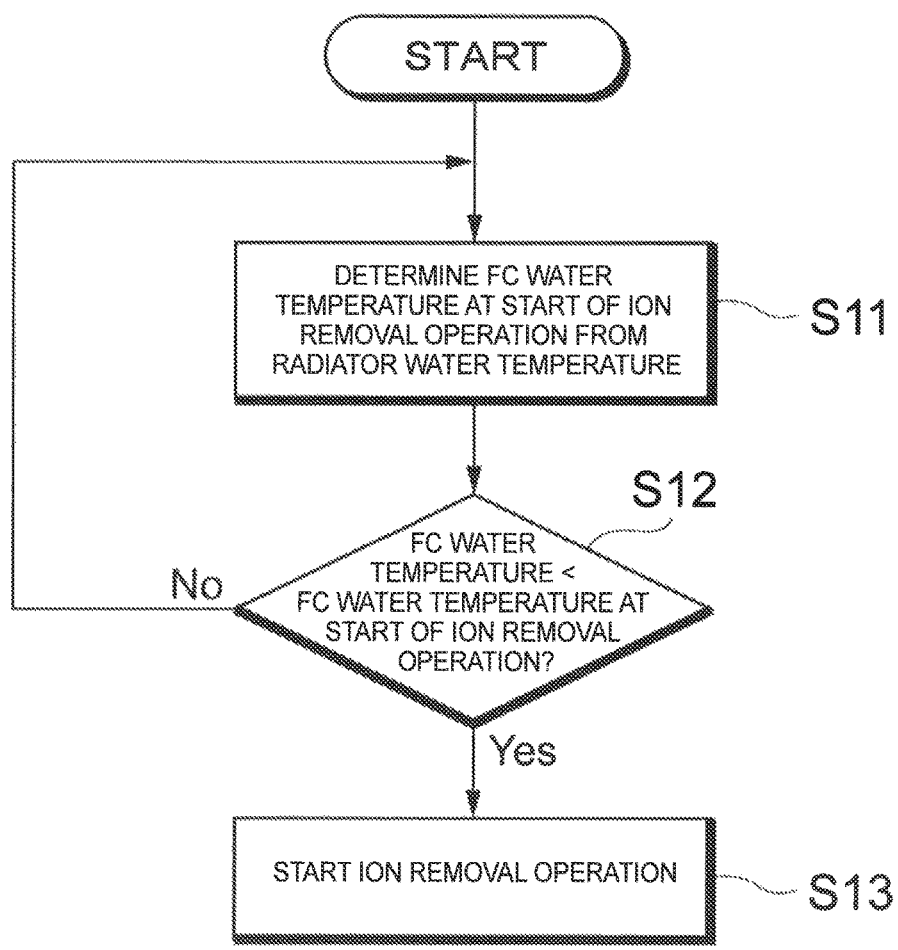

FUEL CELL SYSTEM

BACKGROUND OF THE INVENTION

Field of the Invention

The present invention relates to a fuel cell system.

Background Art

As a system including a fuel cell, there is known a system in which a circulation passage provided with a radiator is connected to a fuel cell to circulate cooling water through the circulation passage and pump the cooling water into the fuel cell after being cooled by a radiator (see Patent Document 1).

CITATION LIST

Patent Document

[Patent Document 1] JP 2010-186599 A

SUMMARY OF THE INVENTION

In the meantime, when the temperature of cooling water in the radiator is below freezing due to low ambient temperature, if the cooling water is circulated, the cooling water in the radiator may flow into the fuel cell to freeze the cooling water in the fuel cell, and this could cause a failure in power generation.

The present invention has been made in view of the above circumstances, and it is an object thereof to provide a fuel cell system capable of preventing low-temperature cooling water from flowing into the fuel cell and freezing water in the fuel cell in order to ensure good operation.

In order to attain the above object, a fuel cell system of the present invention includes:

a fuel cell into which cooling water is flown;

a circulation passage connected to a cooling water inlet and a cooling water outlet of the fuel cell to circulate the cooling water;

a pump provided in the circulation passage to pump the cooling water into the fuel cell from the cooling water inlet;

a radiator provided in the circulation passage to dissipate heat from the cooling water;

a bypass passage connected to the circulation passage in parallel with the radiator;

a flow control valve provided in the circulation passage to adjust a ratio between the flow rates of the cooling water pumped into the radiator and the bypass passage; and a controller for controlling the pump and the flow control valve, wherein the flow control valve can adjust the percentage of the flow rate of the cooling water to the radiator to a predetermined value or smaller, and when the temperature of the cooling water in the fuel cell is determined to be a predetermined temperature or higher after the cooling water is supplied to the fuel cell with the percentage of the flow rate of the cooling water to the radiator set to the predetermined value or larger, the controller performs a predetermined percentage supply operation for controlling the flow control valve and the pump to supply the cooling water to the fuel cell with the percentage of the flow rate of the cooling water to the radiator set to the predetermined value or larger, while when the temperature of the cooling water is determined to be lower than the predetermined temperature, the controller does not supply the cooling water to the fuel cell.

According to this configuration of the fuel cell system, the predetermined percentage supply operation is performed by the controller so that, even when cooling water, the flow rate of which is a percentage higher than or equal to a predetermined value, for example, as a high level to some extent, is supplied from the radiator, the supply of cooling water to the fuel cell is permitted only on condition that the temperature of the cooling water in the fuel cell is a predetermined temperature or higher. Therefore, the cooling water cooled by the radiator can be prevented from flowing into the fuel cell in large amounts before the temperature of the fuel cell sufficiently rises. This can prevent low-temperature cooling water from flowing into the fuel cell and freezing water in the fuel cell, resulting in good operation.

In the fuel cell system of the present invention, an on exchanger may be provided in the bypass passage to remove ions from the cooling water.

According to this configuration of the fuel cell system, ions in the cooling water can be removed, and hence the electric conductivity of the cooling water can be kept at a constant value to ensure insulation on a steady basis.

In the fuel cell system of the present invention, the controller may continue the predetermined percentage supply operation for a predetermined period of time regardless of variations in the temperature of the cooling water, According to this configuration of the fuel cell system, since the predetermined percentage supply operation is continued for a predetermined period of time, the temperature of cooling water to be supplied to the fuel cell after joining from the bypass passage can be estimated steadily and hence subsequent control can be performed accurately.

According to the fuel cell system of the present invention, there can be provided a fuel cell system capable of preventing low-temperature cooling water from flowing into the fuel cell and freezing water in the fuel cell in order to ensure good operation.

BRIEF DESCRIPTION OF THE DRAWINGS

FIG. 3 is a flowchart for describing another example of ion removal operation starting control performed by the controller.

DESCRIPTION OF THE PREFERRED EMBODIMENT

Next, one embodiment of a fuel cell system according to the present invention will be described. In the following, a case where this fuel cell system is applied to an in-vehicle power generation system of a fuel cell vehicle will be described, but the present invention is not limited to such an application example. The present invention is also applicable to all sorts of moving vehicles, such as boats and ships, aircraft, trains, walking robots, etc., and to a stationary power generation system used as a power generating facility for constructions (houses, buildings, etc.).

Figure 1:
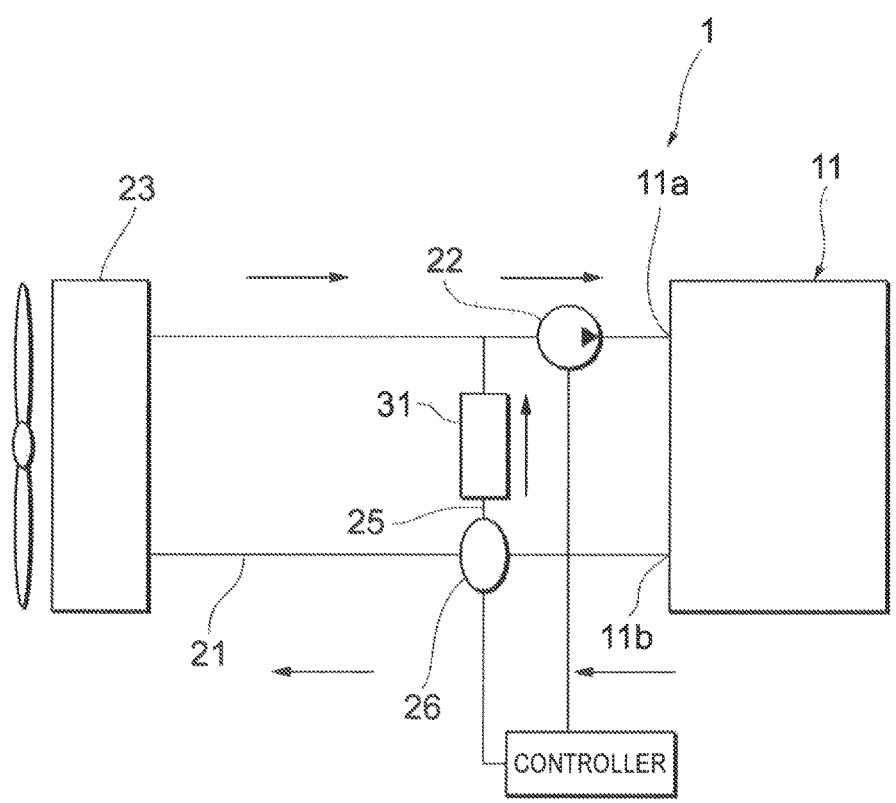
FIG. 1 is a schematic configuration diagram of a fuel cell system according to an embodiment.

FIG. 1 is a schematic configuration diagram of a fuel cell system according to the embodiment.

As shown in FIG. 1, a fuel cell system 1 according to the embodiment includes a fuel cell 11. The fuel cell 11 is, for example, a solid polymer electrolyte fuel cell having a stack structure in which many cells are stacked. Each of the cells of the fuel cell 11 has an air electrode on one face and a fuel electrode on the other face of an electrolyte formed of an ion-exchange membrane, and a pair of separators that sandwich the air electrode and the fuel electrode from both sides. Hydrogen gas is supplied to a fuel gas passage of one separator, and oxidizing gas composed of air is supplied to an oxidizing gas passage of the other separator. The fuel cell 11 generates power by the gas supplies. This fuel cell 11 internally has a cooling water flow path formed by the separators. The fuel cell 11 has a cooling water inlet 11a and a cooling water outlet 11b, where cooling water is pumped into the cooling water flow path from the cooling water inlet 11a, and the cooling water after passing through the cooling water flow path is sent out from the cooling water outlet 11b.

A circulation passage 21 is connected to the fuel cell 11. One end of the circulation passage 21 is connected to the cooling water inlet 11a and the other end thereof is connected to the cooling water outlet 11b.

A pump 22 and a radiator 23 are provided in the circulation passage 21. The pump 22 pumps cooling water into the cooling water flow path inside the fuel cell 11. The radiator 23 performs heat exchange between the cooling water and air. The cooling water is cooled through the radiator 23.

Further, the fuel cell system 1 includes a bypass passage 25. The bypass passage 25 is connected to the circulation passage 21 in parallel with the radiator 23. This enables the cooling water sent out from the cooling water outlet 11b of the fuel cell 11 to be branched to the bypass passage 25, and the cooling water branched to the bypass passage 25 is joined into the circulation passage 21 from the bypass passage 25. Further, a flow control valve 26 is provided in the circulation passage 21. The flow control valve 26 is provided in the circulation passage 21 at a branch point with the bypass passage 25. This flow control valve 26 is a three-way valve capable of adjusting the flow rate of cooling water heading for the radiator 23 and the flow rate of cooling water heading for the bypass passage 25 in the circulation passage 21. Thus, the ratio between the flow rates of cooling water to be flown on the side of the radiator 23 and into the bypass passage 25 can be adjusted by the flow control valve 26. This flow control valve 26 can adjust the percentage of the flow rate of cooling water to the radiator 23 to be smaller than or equal to a predetermined value, for example, as a flow rate of 50%.

Further, an ion exchanger 31 is provided in the bypass passage 25. This ion exchanger 31 has the function of absorbing ions in the cooling water flowing through the bypass passage 25. For example, the ion exchanger 31 has a cation-exchange resin and an anion-exchange resin.

The fuel cell system 1 includes a controller 41. The controller 41 is composed of a microcomputer including, for example, a CPU, a ROM, and a RAM. This controller 41 is configured such that the CPU controls the pump 22 and the flow control valve 26 according to a control program. To this controller 41, an FC water temperature sensor (not shown) for detecting FC water temperature as the temperature of cooling water in the fuel cell 11, an ambient temperature sensor (not shown) for detecting ambient temperature, and a radiator water temperature sensor (not shown) for detecting the temperature of cooling water in the radiator 23 are connected, and detected signals are transmitted from these sensors to the controller 41.

In the fuel cell system 1 configured as above, when the pump 22 is driven by the controller 41, cooling water is circulated through the circulation passage 21. Thus, the cooling water sent out from the cooling water outlet 11b of the fuel cell 11 is pumped into the radiator 23 and heat-exchanged with air, and then supplied from the cooling water inlet 11a of the fuel cell 11 into the fuel cell 11. This leads to cooling the fuel cell 11 with the cooling water.

Here, since the cooling water flowing into the fuel cell 11 passes through multiple cells, electric conductivity must be suppressed to ensure insulation on a steady basis. On the other hand, if the vehicle with the fuel cell system 1 mounted therein has been left derelict for a long period of time without letting cooling water flow, trace ions leaking out of the flow path of the cooling water will be accumulated, and this could increase the ion concentration in the cooling water to increase the electric conductivity. Further, if a part in the cooling system is changed to repair or the like, the ion concentration in cooling water could be increased due to ions leaked out of the changed part to increase the electric conductivity.

Therefore, in the fuel cell system 1, the flow control valve 26 is controlled by the controller 41 to make cooling water sent out from the cooling water outlet 11b of the fuel cell 11 flow into the bypass passage 25 as well. Thus, the cooling water is passed through the ion exchanger 31 of the bypass passage 25 to remove the contained ions by the ion exchanger 31 in order to keep the electric conductivity smaller than or equal to a certain value.

In the meantime, in a case where the temperature of cooling water in the radiator 23 is below freezing, when the pump 22 is driven to circulate the cooling water, the cooling water in the radiator 23 flows into the fuel cell 11, and this could freeze the cooling water in the fuel cell 11 to cause a failure in power generation, Therefore, in the fuel cell system 1 according to the embodiment, the controller 41 performs the following predetermined percentage supply operation to prevent the freezing of cooling water in the fuel cell 11.

When the percentage of the flow rate of cooling water to the radiator 23 is set larger than or equal to a predetermined value to supply the cooling water to the fuel cell 11, the controller 41 determines whether FC water temperature as the temperature of cooling water in the fuel cell 11 is higher than or equal to a predetermined temperature (step S01). In this determination, for example, the predetermined value as the percentage of the flow rate of cooling water sent out to the radiator 23 is 50%, and the predetermined temperature of the FC water temperature is 0° C. This determination is made based on sensing signals from the ambient temperature sensor, the radiator water temperature sensor, and the FC water temperature sensor.

In the above determination, when the temperature of cooling water in the fuel cell 11 is determined to be the predetermined temperature or higher after the cooling water is supplied to the fuel cell 11 with the percentage of the flow rate of the cooling water to the radiator 23 set to the predetermined value or larger, the controller 41 controls the flow control valve 26 and the pump 22 to set the percentage of the flow rate of cooling water to the radiator 23 larger than or equal to the predetermined value to circulate and supply the cooling water to the fuel cell 11. On the other hand, when the temperature of cooling water in the fuel cell 11 is determined to be lower than the predetermined temperature, the controller 41 does not supply cooling water to the fuel cell 11.

The predetermined percentage supply operation mentioned above is performed to avoid freezing of the fuel cell 11 even when circulated cooling water flows into the fuel cell 11. This predetermined percentage supply operation is continued for a predetermined period of time, Further, in a case where the vehicle has been left derelict for a long period of time without letting cooling water flow, the fuel cell system 1 according to the above embodiment performs an on removal operation for bypassing cooling water to the bypass passage 25 to remove ions. At this time, the controller 41 performs ion removal operation starting control to be mentioned below.

Figure 2:
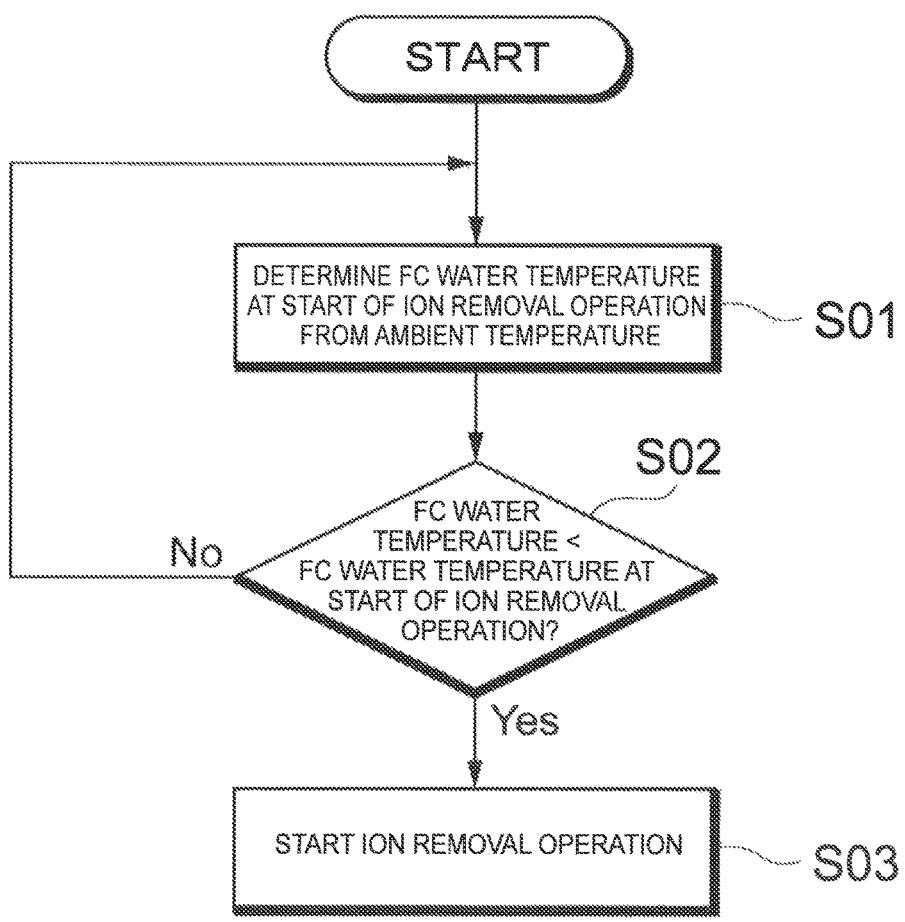
FIG. 2 is a flowchart for describing ion removal operation starting control performed by a controller.

FIG. 2 is a flowchart for describing ion removal operation starting control performed by the controller.

First, based on a sensing signal from the ambient temperature sensor, the controller 41 determines FC water temperature at the start of the ion removal operation (step 801). This FC water temperature at the start of the ion removal operation is determined from a map value prestored in the ROM. The map value is determined by making an estimation from the temperature of the cooling water to be supplied to the fuel cell 11 after joining from the bypass passage 25.

Next, from the determined water temperature at the start of the ion removal operation and a sensing signal from the FC water temperature sensor, the controller 41 determines whether the water temperature at the start of the ion removal operation is higher than FC water temperature as the temperature of cooling water in the fuel cell 11 (step S02).

In this determination, when the water temperature at the start of the ion removal operation is higher than the FC water temperature (step S02: Yes), the controller 41 drives the pump 22 to circulate and send out the cooling water to the fuel cell 11 (step S03). At this time, the cooling water passes through the ion exchanger 31 of the bypass passage 25 so that ions will be removed. On the other hand, when the water temperature at the start of the ion removal operation is lower than or equal to the FC water temperature (step S02: No), the processing step S01 is repeatedly executed. During this period, the controller 41 does not drive the pump 22 so that the cooling water will not be circulated.

In the above control, since the vehicle has been left derelict for a long period of time, it is considered that the temperature of the cooling water in the radiator 23 is equivalent to the ambient temperature. In this case, it is conditioned that the temperature of the cooling water to be supplied to the fuel cell 11 after joining from the bypass passage 25 is 0° C. or higher to prevent cooling water below freezing (below 0° C.) from entering the fuel cell 11. Therefore, when the temperature of the cooling water in the radiator 23 is extremely low due to low ambient temperature, the controller 41 does not permit the ion removal operation until the FC water temperature becomes high enough to be able to ensure that the temperature of the cooling water to be supplied to the fuel cell 11 after joining from the bypass passage 25 is 0° C. or higher.

Further, the degree of opening of the flow control valve 26 on the side of the bypass passage 25 may be kept constant to make it easy to estimate the temperature of the cooling water after joining from the bypass passage 25. Particularly, it is more preferred to set the degree of opening on the side of the bypass passage 25 to about 50% in order to avoid a decrease in the temperature of the cooling water after joining from the bypass passage 25.

In the ion removal operation starting control mentioned above, the controller 41 determines the FC water temperature at the start of the ion removal operation based on the sensing signal form the ambient temperature sensor, but the controller 41 may also determine the FC water temperature at the start of the ion removal operation based on a sensing signal from the radiator water temperature sensor as shown in FIG. 3 (step S11).

Then, from the determined water temperature at the start of the ion removal operation and the sensing signal from the FC water temperature sensor, the controller 41 determines whether the water temperature at the start of the ion removal operation is higher than the FC water temperature (step S12). In this determination, when the water temperature at the start of the ion removal operation is higher than the FC water temperature (step S12: Yes), the controller 41 drives the pump 22 to circulate and send out the cooling water to the fuel cell 11 (step S13). On the other hand, in this determination, when the water temperature at the start of the ion removal operation is lower than or equal to the FC water temperature (step S12: No), the processing step S11 is repeatedly executed. During this period, the controller 41 does not drive the pump 22 so that the cooling water will not be circulated.

As described above, according to the fuel cell system 1 of the embodiment, predetermined percentage supply control is performed by the controller 41 so that, even when cooling water, the flow rate of which is a percentage higher than or equal to a predetermined value, for example, as a high level (e.g., 50%) to some extent, is supplied from the radiator 23, the supply of cooling water to the fuel cell 11 is permitted only on condition that the temperature of the cooling water in the fuel cell 11 is a predetermined temperature (0° C.) or higher. Therefore, the cooling water cooled by the radiator 23 can be prevented from flowing into the fuel cell 11 in large amounts before the temperature of the fuel cell 11 sufficiently rises. This can prevent low-temperature cooling water from flowing into the fuel cell and freezing water in the fuel cell, resulting in good operation.

Further, in the fuel cell system 1 according to the embodiment, the ion exchanger 31 is provided in the bypass passage 25 to remove ions from cooling water. Therefore, ions in the cooling water can be removed, and hence the electric conductivity of the cooling water can be kept smaller than or equal to a certain value to ensure insulation on a steady basis.

Further, since the predetermined percentage supply operation is continued for a predetermined period of time, the temperature of cooling water to be supplied to the fuel cell 11 after joining from the bypass passage 25 can be estimated steadily and hence subsequent control can be performed accurately.

REFERENCE NUMERALS 1 fuel cell system
11 fuel cell
11a cooling water inlet
11b cooling water outlet
21 circulation passage
22 pump
23 radiator
25 bypass passage
26 flow control valve
31 ion exchanger
41 41 controller

What is claimed is:
1. A fuel cell system comprising:
a fuel cell into which cooling water is flown;
a circulation passage connected to a cooling water inlet and a cooling water outlet of the fuel cell to circulate the cooling water;
a pump provided in the circulation passage to pump the cooling water into the fuel cell from the cooling water inlet;

a radiator provided in the circulation passage to dissipate heat from the cooling water;

a bypass passage connected to the circulation passage in parallel with the radiator;

a radiator water temperature sensor for detecting the temperature of cooling water in the radiator;

a flow control valve provided in the circulation passage to adjust a ratio between flow rates of the cooling water pumped into the radiator and the bypass passage; and a controller for controlling the pump and the flow control valve, wherein the flow control valve can adjust percentage of the flow rate of cooling water to the radiator to a predetermined value or smaller, and when the temperature of the cooling water in the radiator detected by the radiator water temperature sensor is below freezing, and when a temperature of the cooling water in the fuel cell is estimated to be a predetermined temperature or higher after the cooling water is supplied to the fuel cell with the percentage of the flow rate of the cooling water to the radiator set to the predetermined value or larger, the controller is programmed to perform a predetermined percentage supply operation for controlling the flow control valve and the pump to supply the cooling water to the fuel cell with the percentage of the flow rate of the cooling water to the radiator set to the predetermined value or larger, while when the temperature of the cooling water in the fuel cell is determined to be lower than the predetermined temperature, the controller is programmed not to supply the cooling water to the fuel cell.

2. The fuel cell system according to claim 1, wherein an ion exchanger for removing ions from the cooling water is provided in the bypass passage.

3. The fuel cell system according to claim 1, wherein the controller is programmed to continue the predetermined percentage supply operation for a predetermined period of time regardless of variations in the temperature of the cooling water.

4. The fuel cell system according to claim 2, wherein the controller is programmed to continue the predetermined percentage supply operation for a predetermined period of time regardless of variations in the temperature of the cooling water.

5. The fuel cell system according to claim 2, wherein the controller is further configured to determine a water temperature at the start of an ion removal operation and continue the ion removal operation when the water temperature at the start of the ion removal operation is higher than the temperature of the cooling water in the fuel cell.

* * * * *